United States Patent Office 3,108,945
Patented Oct. 29, 1963

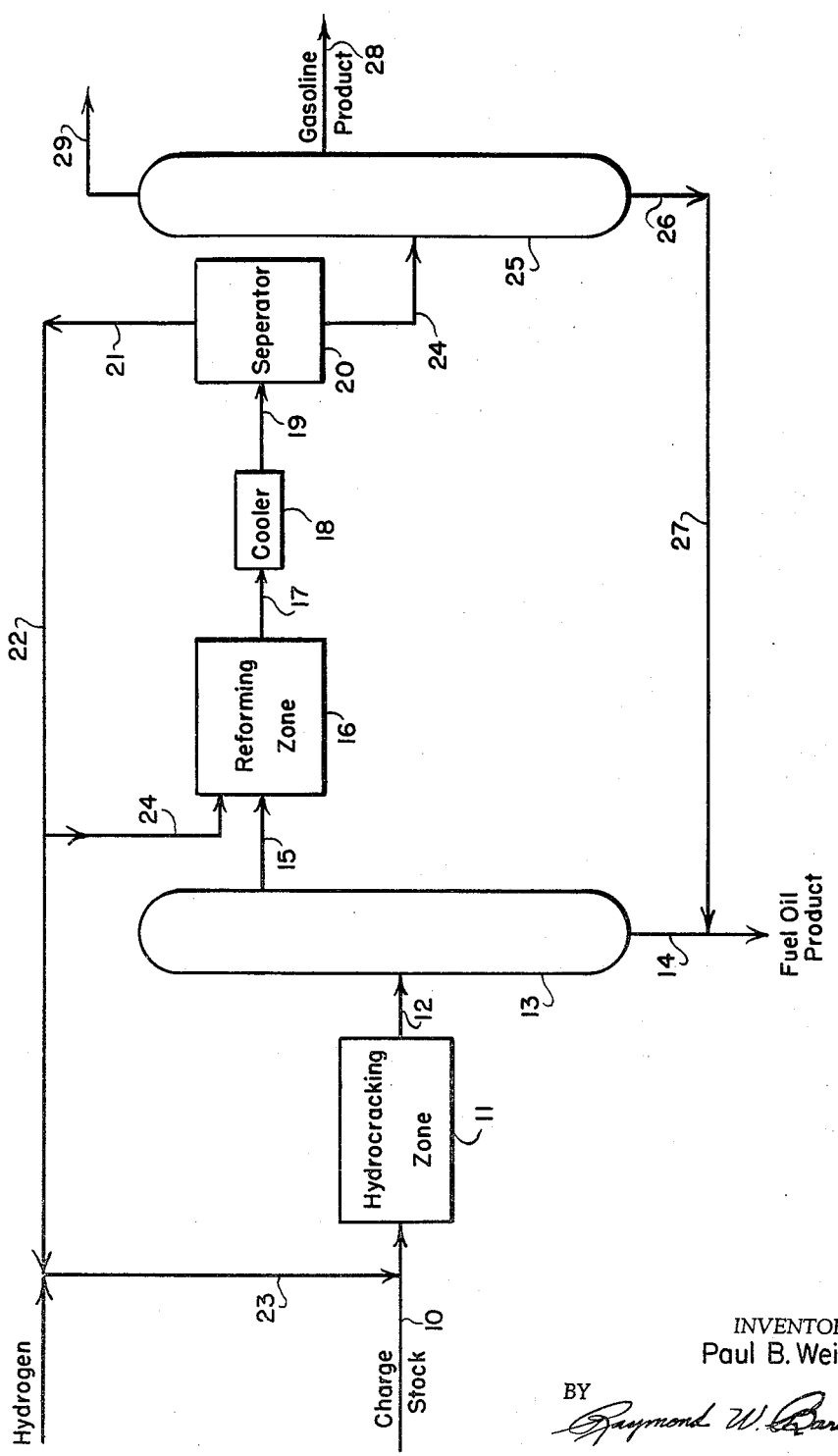

3,108,945
CATALYTIC CONVERSION OF HYDROCARBONS
Paul B. Weisz, Media, Pa., assignor to Socony Mobil Oil Company, Inc., a corporation of New York
Filed Nov. 19, 1959, Ser. No. 854,124
9 Claims. (Cl. 208—60)

This invention relates to a catalytic process for improving hydrocarbon fractions. More particularly, the present invention is directed to a unique treatment of specific hydrocarbon fractions in the presence of hydrogen whereby a high yield of gasoline is obtained with accompanying reduction in over-all consumption of hydrogen.

Hydrocracking is a catalytic conversion operation in which a hydrocrackable hydrocarbon charge and, particularly, heavy petroleum fractions such as gas oils, cycle stocks, residuals etc. are contacted with solid catalyst particles in the presence of hydrogen at elevated temperatures and pressures whereby the hydrocarbon charge undergoes conversion with consumption of hydrogen to lighter material boiling in the range of gasoline. Hydrocracking is carried out in the presence of hydrogen at temperatures generally between about 400° F. and about 950° F. in the pressure range of from about 100 to about 3000 pounds per square inch. The operation is effected in the presence of catalytic composites consisting essentially of a cracking component of silica combined with alumina, magnesia, zirconia, etc. which cracking component is impregnated with a minor proportion of a hydrogenation-dehydrogenation component such as molybdena, cobalt oxide, platinum, palladium, etc. The liquid hourly space velocity, i.e. the liquid volume of hydrocarbon per hour per volume of catalyst is between about 0.1 and about 4. The molar ratio of hydrogen to hydrocarbon charge employed in hydrocracking is generally between about 2 and about 80.

It has also been proposed to reform naphthas or gasoline fractions. Reforming is carried out by contacting the charge with solid catalyst particles in the presence of hydrogen at elevated temperatures and pressures whereby the hydrocarbon fractions is increased in aromaticity and in which operation there is ordinarily no net consumption of hydrogen. Reforming is generally effected in the presence of a suitable catalyst at temperatures in the range of 750 to 1150° F. and at pressures of from atmospheric to about 1000 pounds per square inch at liquid hourly space velocities of from about 0.1 to about 5 volumes/volume/hour in the presence of from about 0.5 to about 10 mols of hydrogen per mol of feed. Catalyst for this purpose include compounds of the metals of the left hand column of groups V and VI of the periodic table and in particular, the oxides of chromium, molybdenum, tungsten and vanadium, either alone or in admixture with one another and composited with such materials as alumina, magnesia, silica or mixtures thereof. A preferred type of reforming catalyst has been one comprising a metal of the platinum group associated with a porous carrier which has slightly acidic properties by virtue of halogen or boron oxide associated with alumina or due to the use as a support of combinations of silica with alumina, magnesia, zirconia and the like to yield compositions characterized by acidic catalytic sites.

It has heretofore been known to carry out hydrocracking of hydrocarbon oils and to subsequently subject the gasoline fraction resulting from such hydrocracking to reforming. When hydrocracking has been practiced in the presence of a catalyst comprising a hydrogenation-dehydrogenation component, it is a characteristic of such a process to give high selectivity but also a degree of fuel oil product saturation which is beyond the stage of utility. This is particularly the case when the catalyst possesses high activity of hydrogenation such as those containing a platinum metal deposited on a cracking component. This means that considerable hydrogen consumption results in such a process due to excessive product saturation. On the other hand, the gasoline boiling range product from a hydrocracking operation is reformed to obtain a high quality gasoline. As will be realized, an important factor in hydrocarbon conversion carried out in the presence of hydrogen is the cost of hydrogen. Accordingly, any suitable means for reducing the over-all consumption of hydrogen is to be highly desired.

It is a major object of the present invention to provide an improved combination hydrocracking-reforming process to afford a high yield of gasoline with an over-all reduction in hydrogen consumption. It is a further object to provide an integrated hydrocracking-reforming process wherein certain hydrocarbon fractions are subjected to conversion under specified conditions to afford a high yield of resultant gasoline with a reduced consumption of hydrogen.

The above and other objects which will be apparent to those skilled in the art are achieved in accordance with the present invention. Broadly, the process of the invention comprises conducting a hydrocrackable hydrocarbon charge to a hydrocracking zone maintained under hydrocracking conditions and containing a hydrocracking catalyst comprising a hydrogenation-dehydrogenation component including one or more of the metals of groups V, VI and VIII of the periodic table either in elemental form or in the form of oxides or sulfides of these metals to yield a product comprising components boiling in the gasoline and fuel oil range. Representative of the hydrogenation-dehydrogenation components are molybdenum, chromium, tungsten, vanadium, cobalt, nickel and metals of the platinum group, i.e. platinum, palladium, rhodium, osmium, iridium, and ruthenium as well as combinations of these metals, their oxides or sulfides. Preferably, the catalyst is one consisting essentially of an acidic cracking component of two or more refractory oxides of elements selected from groups IIA, IIIB, IVA and IVB of the periodic table, characterized by an activity index, as hereinafter defined, of at least 25, which component has deposited thereon between about 0.05 and 10 percent by weight of the finished catalyst of a platinum metal. The product resulting from hydrocracking is subjected to fractionation to separate therefrom a fuel oil fraction having an initial boiling point of about 500° F. and a lighter fraction having an end boiling point of about 500° F. and characterized by components boiling within the approximate range of 400 to 500° F. The latter fraction is conducted to a reforming zone maintained under reforming conditions and containing a reforming catalyst. The resulting reformate is separated into a gasoline fraction boiling below about 400° F. and a fraction boiling above about 400° F. The latter fraction is blended with the aforesaid fuel oil fraction. Hydrogen produced during reforming is recycled from the reforming zone to the hydrocracking zone affording an overall reduction in hydrogen consumption. The gasoline and blended fuel oil fractions produced are collected.

In conventional reforming, it is customary to process petroleum distillate which has a boiling range of approximately 200 to 400° F. to a gasoline product. The distillate materials boiling within the range of 400 to 500° F. lie in a fringe area between gasoline and distillate fuels and have a somewhat indefinite designation as products. A petroleum distillate fraction having an initial boiling point of about 400° F. and an end boiling point of about 500° F. consists of hydrocarbons of carbon numbers ranging approximately from $C_{11}$ to $C_{15}$ and composed of varying quantities of paraffins, naphthenes and aromatics. For example, a typical Mid-Continent distillate cut boiling within such range may contain, on a weight basis, 32% paraffins, 32% monocycloparaffins, 15% dicycloparaffins, 15% monocycloparaffins, and 6% dicycloaromatics.

In accordance with the process of the present invention a hydrocarbon charge stock is initially subjected to catalytic hydrocracking. The product from hydrocracking is fractionated to obtain a fuel oil fraction and a lighter fraction of the above-mentioned type, which fraction is subjected to catalytic reforming followed by separation into fractions boiling respectively below and above 400° F. The fraction boiling below 400° F. represents additional gasoline product. The fraction boiling above 400° F. is blended with the previously obtained fuel oil fraction and hydrogen produced in the reforming operation is conducted to the hydrocracking operation.

The liquid products produced from a 400–500° F. boiling range petroleum cut in the process of this invention are quite similar when such fraction is processed either alone or in conjunction with a lighter portion of a petroleum fraction such as a standard range naphtha fraction, as used to obtain gasoline in accordance with conventional reforming operations. Thus, conversion of a petroleum fraction having an initial boiling point of about 400° F. and an end boiling point of about 500° F. may, in accordance with the process described herein, either be carried out alone or practiced simultaneously with reforming of a standard naphtha fraction boiling in the range of 200–400° F. Accordingly, it is contemplated that the petroleum fraction utilized as charge stocks herein for the reforming operation, essentially be characterized by an end boiling point of 500° F. and by the presence of components boiling over the range of 400 to 500° F. Such fractions include those boiling within the approximate range of 400 to 500° F. as well as those boiling over the somewhat broader range of approximately 200 to 500° F.

During reforming of such fractions, components boiling between about 400° F and about 500° F. undergo the following reactions:

(a) Paraffins in the original boiling range, having carbon numbers around $C_{11}$ to $C_{14}$, hydrocrack, with major products (corresponding to center-cracking) being paraffins near $C_5$ to $C_7$, with a limited amount of cyclization to aromatics, all of the products boiling below 400° F.

(b) Naphthenes (monocyclic) become aromatized (or isomerized-aromatized in the case of 5-membered rings) and partly dealkylated, resulting in a portion of material boiling below 400° F.

(c) Alkyl-aromatics present in the charge undergo partial dealkylation resulting in a portion of material boiling below 400° F.

(d) Polycyclic naphthenes are partly or wholly aromatized, as a result a portion thereof move up in the boiling range above 500° F.

Conversion during the reforming operation leaves an aromatic residue above the 400° F. boiling point. Moreover, with increasing reforming severity (a) all alkylbenzenes undergo conversion to products boiling below about 400° F. (b) all dicyclic materials become fully aromatized to naphthalenes. In the limit of severity, therefore, reforming of 400–500° F. boiling range hydrocarbon mixtures would be expected to yield naphthalenes almost exclusively. Approximately 1½ fold increase of hydrogen production is observed in the case of reforming of the 400–500° F. boiling range petroleum distillate as compared with normal reforming of a petroleum distillate boiling in the range of 200 to 400° F.

The initial hydrocracking step of the present process involves contacting a hydrocrackable hydrocarbon charge such as a gas oil fraction with a hydrocracking catalyst comprising a hydrogenation-dehydrogenation component and preferably consisting of an acidic cracking component of two or more refractory oxides of the elements of groups IIA, IIIB, IVA and IVB of the periodic table, characterized by an activity index of at least 25, which component has deposited thereon between about 0.05 and 10 percent by weight of the finished catalyst of one or more of the platinum metals, i.e. platinum, palladium, rhodium, osmium, iridium, and ruthenium. Hydrocracking is carried out in the presence of hydrogen at a pressure between about 100 and about 3000 pounds per square inch gauge having a liquid hourly space velocity of between about 0.1 and about 10 at a temperature between about 400° F. and 950° F. employing a molar ratio of hydrogen to hydrocarbon charge between about 2 and about 80.

The conventional cracking activity of catalysts is generally expressed in terms of the percent by volume of a standard hydrocarbon charge which is cracked under specific conditions in the CAT–A test. The method of this test is described in National Petroleum News 36 page R–537 (August 2, 1944) and the cracking activity so determined is referred to as the "activity index" (A.I.). Accordingly, it will be understood that the term "activity index" when employed herein shall refer to the cracking activity of the material under consideration determined in accordance with the CAT–A method.

The above hydrocracking step is distinct from reforming. Thus, there are at least four differences between hydrocracking and reforming operations. First of all, the processes are carried out for two different purposes. Cracking is used to convert high boiling hydrocarbon fractions into low boiling hydrocarbon fractions while reforming is carried out for the sole purpose of increasing the octane number of low boiling hydrocarbon fractions with little or no cracking. Secondly, the charge stocks employed in cracking and in reforming are not the same. A reforming charge stock, i.e. gasolines, kerosenes, or naphthas ordinarily has a lower initial boiling point than a hydrocracking charge stock. A third difference relates to the chemical reactions involved in the process. In reforming, it is desired to produce gasolines having substantial hydrocarbon contents from highly aliphatic reforming charge stocks. Accordingly, reforming involves aromatization reactions resulting in the production of large amounts of hydrogen during the reforming operation. Hydrocracking, on the other hand, does not involve these aromatization reactions since the purpose thereof is to convert high boiling hydrocarbons by selected breakage of carbon to carbon bonds. In contrast to reforming, such operation consumes hydrogen. A still further distinction resides in the fact that hydrocracking is obtainable at temperatures that are lower than the temperatures at which reforming is obtainable. It will accordingly be appreciated that the hydrocracking and reforming steps of the process of this invention are distinct.

The catalyst used in hydrocracking preferably comprises an acidic cracking component. Typical acidic cracking components include synthetic composites of two or more refractory oxides of elements of groups IIA, IIIB, IVA and IVB of the periodic table. Non-limiting examples of suitable synthetic composites include silica-alumina, silica-zirconia, silica-alumina-zirconia, silica-alumina-thoria, silica-magnesia, silica-alumina-magnesia, alumina, boria and the like. The preferred cracking component is a synthetic composite of silica and alumina containing between about 3 and about 20 and especially from about 5 to about 13 percent by weight of alumina.

The above component preferably has deposited thereon a catalytically effective amount of a platinum metal, i.e. platinum, palladium, rhodium, osmium, iridium, and ruthenium as well as alloys or mixtures of these metals. Of the foregoing, platinum and palladium and, in particular, platinum are accorded preference. The amount of the platinum metal contained in the instant catalyst is generally between about 0.05 and about 10 percent by weight of the finished catalyst, and more particularly, between about 0.1 and about 5 percent by weight of the finished catalyst. The platinum metal may be deposited on the acidic cracking component in any suitable manner well known in the art.

The product from the hydrocracking step carried out in the presence of the above-described catalyst is fractionated to yield a fuel oil fraction having an initial boiling point exceeding about 500° F. and a lighter fraction having an end boiling point of about 500° F. and characterized by components boiling within the approximate range of 400 to 500° F. The latter fraction is subjected to catalytic reaction under reforming conditions in the presence of a reforming catalyst. Suitable catalytic composites include compounds of the metals of the left hand columns of groups V and VI of the periodic table and, in particular, the oxides of chromium, molybdenum, tungsten and vanadium either alone or in admixture with one another and composited with such materials as alumina, magnesia, silica, or mixtures thereof. The particular process conditions of time, temperature, pressure and the like, employed in any specific operation will vary depending upon the particular catalyst used. The preferred type of catalyst is one comprising a metal of the platinum group associated with a porous carrier which has slightly acidic properties by virtue of halogen or boron oxide associated with alumina or due to the use as a support of combinations of silica, with alumina, magnesia, zirconia and the like, to yield composites characterized by acidic catalytic sites. In particular, it is preferred to employ a catalyst of platinum and alumina for reforming. Such catalyst may contain substantial amounts of platinum but for economic as well as for product yield and quality reasons, the platinum content will usually be within the range of from about .01 to about 5 percent by weight. A particularly effective catalyst of this type contains relatively minor proportions, usually less than about 5 percent by weight, on a dry alumina basis, of a halogen such as chlorine or fluorine. Such reforming catalyst may be prepared by various procedures well known in the art.

The conditions in the reforming zone generally include a temperature within the range of from about 600° F. to about 1000° F., a pressure of from about 50 to about 1000 pounds per square inch and a liquid hourly space velocity of from about 0.1 to about 10. Reforming is carried out in the presence of hydrogen. Generally, hydrogen is introduced from an external source at the beginning of the operation and hydrogen, produced during the course of reforming, is recycled within the process in order to be assured of a sufficient hydrogen atmosphere in the reaction zone. The hydrogen present in the reaction zone may be within the range of from about 0.5 to about 20 mols of hydrogen per mol of hydrocarbon.

The effluent from the reforming zone is usually passed through a cooler and into a separator. In the separator, a separation is effected to provide a gaseous hydrogen-containing stream and an aromatic-rich hydrocarbon stream. At least a portion of the hydrogen-rich stream is recycled to the hydrocracking zone. The liquid reformate is then subjected to fractionation to obtain a fraction boiling above and another fraction boiling below approximately 400° F. As a result of such fractionation, there is obtained a liquid boiling below 400° F. which constitutes a high octane gasoline. There is also obtained a liquid boiling above 400° F. which is blended with the fuel oil fraction previously obtained.

The processing steps of the present invention are shown in the single FIGURE of the attached drawing. Referring more particularly to the drawing, a hydrocrackable charge stock is conducted through line 10 to a hydrocracking zone 11 containing a suitable hydrocracking catalyst such as for example, platinum on silica-alumina, and maintained under hydrocracking conditions in the presence of hydrogen. The product is conducted from the hydrocracking zone through line 12 to a fractionator 13. A fuel oil fraction made up of components boiling above about 500° F. is withdrawn from the bottom of fractionator 13 through line 14. A lighter liquid fraction made up of components boiling below about 500° F. is withdrawn from the upper portion of fractionator 13 through line 15 and conducted to a reforming zone 16 containing a suitable reforming catalyst such as for example, platinum on alumina, maintained under suitable reforming conditions in the presence of hydrogen. The product from the reforming zone is conducted through line 17 to a cooler 18 and thereafter through line 19 to separator 20. Hydrogen-rich gas is withdrawn overhead from separator 20 through line 21 and recycled through lines 22 and 23 to hydrocracking zone 11. A portion of the hydrogen recycle may, if desired, be conducted through line 24 to reforming zone 16. The liquid reformate is conducted from separator 20 through line 24 to secondary fractionator 25 wherein a gasoline fraction boiling below about 400° F. is separated from a heavier fraction boiling above about 400° F. The latter fraction is conducted through lines 26 and 27 and blended with the fuel oil fraction passing through line 14. The gasoline fraction is removed from secondary fractionator 25 through line 28. Light gases are withdrawn from such fractionator through line 29.

The following illustrative and comparative examples will serve to illustrate the advantages of the invention.

EXAMPLE 1

A gas oil having an initial boiling point of 386° F. and a 93 percent ASTM point of 718° F. was subjected to hydrocracking in the presence of a catalyst of 0.5% platinum deposited on a silica-alumina cracking component having an activity index of 46 and a surface area of 430 square meters per gram. Hydrocracking was carried out at a pressure of 2000 pounds per square inch gauge, at a liquid hourly space velocity of 0.5 utilizing 29,000 standard cubic feet of hydrogen per barrel of charge. Severity of the operation was adjusted to produce 34.3 volume percent, based on charge, of material boiling above 390° F., the balance being gasoline boiling below 390° F.

The product from hydrocracking was fractionated to obtain a fraction boiling in the approximate range of 170 to 500° F. Such fraction was subjected to reforming in the presence of a catalyst of 0.6 percent by weight of platinum deposited on alumina. Reforming was carried out at a temperature of about 892° F., at a pressure of 500 pounds per square inch gauge, a mol ratio of hydrogen to naphtha of about 10, a liquid hourly space velocity of 2, to produce 96.5 octane number 10 RVP gasoline having an end point of 390° F. The products from reforming were analyzed and the results are hereinafter set forth in Table I.

EXAMPLE 2

A gas oil charge was hydrocracked in the same manner and under the same conditions as specified in Example 1. The product from the hydrocracking zone was fractionated to yield a material boiling below about 390° F. and a material boiling above about 390° F. The material boiling below 390° F. was subjected to reforming in the presence of a catalyst of 0.6 percent by weight of platinum on alumina, at a pressure of about 500 pounds per square inch gauge, employing a mol ratio of hydrogen to charge of about 10, a temperature of about 835° F. and a liquid hourly space velocity of about 2 to produce 96.5 octane number 10 RVP gasoline. The product from the reforming zone was analyzed and the results are shown in Table I below.

Table I

|  | Example 2 Naptha (170-390°F.) | Example 1 Wide Range (170-500°F.) |
|---|---|---|
| Dry Gas (C¹-C³) Wt. percent | 5.1 | 9.3 |
| Excess n-C⁴, Vol. percent | Nil | 0.3 |
| Excess i-C⁴, Vol. percent | ᵃ1.4 | 7.7 |
| 10# Gasoline, Vol. percent (96.5 O.N.) | 74.7 | 79.2 |
| #2 Fuel Oil, Vol. percent | ᶜ34.3 | ᵇ21.3 |
| H₂ Consumption, s.c.f./bbl | 860 | 630 |

ᵃ 2.8 Vol. percent i-C₄ used to bring gasoline to 10# RVP.
ᵇ Blend of 500° F.+ product from hydrocracking (7.9 vol. percent) plus 400° F.+ product from reforming (13.4 vol. percent).
ᶜ All from hydrocracking step.

It will be seen from the foregoing comparative data that in Example 1, use was made of the ability of the reforming action on 400-500° F. to extract hydrogen from that portion of the hydrocarbons to improve the overall hydrogen reforming of the process and to produce additional gasoline range material which allows operation of the hydrocracker at reduced severity, to improve catalyst life as well as further improvement in excess gas production and hydrogen consumption.

EXAMPLE 3

A gas oil having a boiling point in excess of 650° F. was subjected to hydrocracking in the presence of a catalyst of 0.5 percent platinum on a silica-alumina cracking component having an activity index of 46. Hydrocracking was carried out at a pressure of 2000 pounds per square inch gauge, at a liquid hourly space velocity of 0.5 utilizing 3000 standard cubic feet of hydrogen per barrel of charge. The product from hydrocracking was subjected to fractionation to obtain a fraction boiling in the range of from 170 to 390° F. This fraction was subjected to reforming in the presence of a catalyst of 0.6 percent by weight of platinum on alumina at a pressure of 500 pounds per square inch gauge utilizing a liquid hourly space velocity of 2 and a 10:1 hydrogen to oil mol ratio.

EXAMPLE 4

A gas oil was subjected to hydrocracking under the conditions specified in Example 3. The product from the hydrocracking zone was fractionated to obtain a fraction boiling in the range 170 to 500° F. This fraction was subjected to reforming under the reforming conditions described in Example 3.

The results of the combined hydrocracking-reforming in Examples 3 and 4 are shown in Table II below.

Table II

|  | Example 3 | | | Example 4 | | |
|---|---|---|---|---|---|---|
| Hydrocracking Conversion ((390° F) | 25.9 | | | 25.9 | | |
| Reformer Charge Boiling Range, °F | 170-390 | | | 170-500 | | |
| 10# Gasoline O.N. (F-1, 3 ml.) | 98 | 100 | 102 | 98 | 100 | 102 |
| 10# Gasoline Yield, Vol. percent | 32.8 | 31.5 | 29.2 | 36.5 | 35.4 | 33.8 |
| Dry Gas, Wt. percent | 2.51 | 3.03 | 4.02 | 3.30 | 4.05 | 5.36 |
| Excess n-Butanes, Vol. percent | -1.1 | -0.6 | +0.3 | -0.7 | -0.2 | +0.5 |
| i-Butane, Vol. percent | 2.1 | 2.3 | 2.5 | 2.1 | 2.3 | 2.9 |
| #2 Fuel Oil (650° F.E.P.), Vol. percent | 31.6 | 31.6 | 31.6 | 26.9 | 25.8 | 25.1 |
| 650° F. Cycle Stock, Vol. percent | 42.5 | 42.5 | 42.5 | 42.5 | 42.5 | 42.5 |
| Hydrogen Consumption, s.c.f./bbl | 700 | 680 | 650 | 590 | 600 | 620 |

It will be evident from the foregoing data that reforming the resulting 500° F. end point naphtha rather than 390° F. end point naphtha increases the gasoline yield by 3.5-4 volume percent. The drop in net hydrogen consumption of the integrated process is 110 standard cubic feet per barrel at the 98 octane number level.

The process of the invention accordingly provides a method for increasing the gasoline to fuel oil ratio to afford a high yield of gasoline with an accompanying net reduction in hydrogen consumption thereby fulfilling the objects set forth hereinabove.

It is to be understood that the above description is merely illustrative of preferred embodiments of the invention of which many variations may be made within the scope of the following claims by those skilled in the art without departing from the spirit thereof.

I claim:

1. A catalytic process which comprises conducting a hydrocrackable hydrocarbon charge to a hydrocracking zone maintained under hydrocracking conditions and containing a hydrocracking catalyst consisting essentially of an acidic cracking component of at least two refractory oxides of elements selected from groups IIA, IIIB, IVA and IVB of the periodic table, characterized by an activity index of at least 25, which component has deposited thereon between about 0.05 and about 10 percent by weight of the finished catalyst of a platinum metal to yield a product comprising components boiling in the gasoline and fuel oil range, subjecting said product to fractionation to separate therefrom a fuel oil fraction having an initial boiling point of about 500° F. and a lighter fraction having an end boiling point of about 500° F. and characterized by components boiling within the approximate range of 400 to 500° F., conducting the latter fraction to a reforming zone maintained under reforming conditions and containing a reforming catalyst, separating the resulting reformate into a gasoline fraction boiling below about 400° F. and a fraction boiling above about 400° F., blending the latter fraction with the aforesaid fuel oil fraction, recycling hydrogen produced in the reforming zone to the hydrocracking zone and collecting said gasoline fraction and the blended fuel oil fraction.

2. A catalytic process which comprises conducting a hydrocrackable hydrocarbon charge to a hydrocracking zone maintained under hydrocracking conditions and containing a hydrocracking catalyst consisting essentially of an acidic cracking component of at least two refractory oxides of elements selected from groups IIA, IIIB, IVA and IVB of the periodic table, characterized by an activity index of at least 25, which component has deposited thereon between about 0.05 and about 10 percent by weight of the finished catalyst of a platinum metal to yield a product comprising components boiling in the gasoline and fuel oil range, subjecting said product to fractionation to separate therefrom a fuel oil fraction having an initial boiling point of about 500° F. and a lighter fraction having an initial boiling point of about 200° F. and an end boiling point of about 500° F., conducting the latter fraction to a reforming zone maintained under reforming conditions and containing a reforming catalyst, separating the resulting reformate into a gasoline fraction boiling below about 400° F. and a fraction boiling above about 400° F., blending the latter fraction with the aforesaid fuel oil fraction, recycling hydrogen produced in the reforming zone to the hydrocracking zone and collecting said gasoline fraction and the blended fuel oil fraction.

3. A catalytic process which comprises conducting a hydrocrackable hydrocarbon charge to a hydrocracking zone maintained under hydrocracking conditions and containing a hydrocracking catalyst consisting essentially of an acidic cracking component of at least two refractory oxides of elements selected from groups IIA, IIIB, IVA and IVB of the periodic table, characterized by an activity index of at least 25, which component has deposited thereon between about 0.05 and about 10 percent by weight of the finished catalyst of a platinum metal to yield a product comprising components boiling in the gasoline and fuel oil range, subjecting said product to fractionation to separate therefrom a fuel oil fraction having an initial boiling point of about 500° F. and a lighter fraction having an initial boiling point of about 400° F. and an end boiling point of about 500° F., conducting the latter fraction to a reforming zone maintained under reforming conditions and containing a reforming catalyst, separating the resulting reformate into a gasoline fraction boiling below about 400° F. and a fraction boiling above about 400° F., blending the latter fraction with the aforesaid fuel oil fraction, recycling hydrogen produced in the reforming zone to the hydrocracking zone and collecting said gasoline fraction and the blended fuel oil fraction.

4. A catalytic process which comprises conducting a hydrocrackable hydrocarbon charge to a hydrocracking zone maintained under hydrocracking conditions and containing a hydrocracking catalyst comprising an acidic cracking component having deposited thereon a hydrogenation-dehydrogenation component to yield a product comprising components boiling in the gasoline and fuel oil range, subjecting said product to fractionation to separate therefrom a fuel oil fraction having an initial boiling point of about 500° F. and a lighter fraction having an end boiling point of about 500° F. and characterized by components boiling within the approximate range of 400 to 500° F., conducting the latter fraction to a reforming zone maintained under reforming conditions and containing a reforming catalyst, separating the resulting reformate into a gasoline fraction boiling below about 400° F. and a fraction boiling above about 400° F., blending the latter fraction with the aforesaid fuel oil fraction, recycling hydrogen produced in the reforming zone to the hydrocracking zone and collecting said gasoline fraction and the blended fuel oil fraction.

5. A catalytic process which comprises conducting a hydrocrackable hydrocarbon charge to a hydrocracking zone maintained under hydrocracking conditions and containing a hydrocracking catalyst comprising an acidic cracking component having deposited thereon a hydrogenation-dehydrogenation component to yield a product comprising components boiling in the gasoline and fuel oil range, subjecting said product to fractionation to separate therefrom a fuel oil fraction having an initial boiling point of about 500° F. and a lighter fraction having an initial boiling point of about 200° F. and an end boiling point of about 500° F., conducting the latter fraction to a reforming zone maintained under reforming conditions and containing a reforming catalyst, separating the resulting reformate into a gasoline fraction boiling below about 400° F. and a fraction boiling above about 400° F., blending the latter fraction with the aforesaid fuel oil fraction, recycling hydrogen produced in the reforming zone to the hydrocracking zone and collecting said gasoline fraction and the blended fuel oil fraction.

6. A catalytic process which comprises conducting a hydrocrackable hydrocarbon charge to a hydrocracking zone at a temperature between about 400° F. and about 950° F., a pressure of between about 100 and about 3000 pounds per square inch, utilizing a liquid hourly space velocity of between about 0.1 and about 4 in the presence of a molar ratio of hydrogen to hydrocarbon of between about 2 and about 80 and in the presence of a hydrocracking catalyst consisting essentially of an acidic cracking component of at least two refractory oxides of elements selected from groups IIA, IIIB, IVA and IVB of the periodic table, characterized by an activity index of at least 25, which component has deposited thereon between about 0.05 and about 10 percent by weight of the finished catalyst of a platinum metal to yield a product comprising components boiling in the gasoline and fuel oil range, subjecting said product to fractionation to separate therefrom a fuel oil fraction having an initial boiling point of about 500° F., a lighter fraction having an end boiling point of about 500° F. and characterized by components boiling within the approximate range of 400 to 500° F., conducting the latter fraction to a reforming zone maintained at a temperature between about 600° F. and about 1000° F., a pressure between about 50 and about 1000 pounds per square inch, a liquid hourly space velocity of between about 0.1 and about 10 and a hydrogen to hydrocarbon mole ratio of 0.5 to 20 in the presence of a reforming catalyst, separating the resulting reformate into a gasoline fraction boiling below about 400° F. and a fraction boiling above about 400° F., blending the latter fraction with the aforesaid fuel oil fraction, recycling hydrogen produced in the reforming zone to the hydrocracking zone and collecting said gasoline fraction and the blended fuel oil fraction.

7. The process of claim 4 wherein the hydrocracking catalyst is platinum deposited on a silica-alumina composite and where the reforming catalyst is platinum deposited on alumina.

8. A catalytic process which comprises conducting a hydrocrackable hydrocarbon charge to a hydrocracking zone at a temperature between about 400° F. and about 950° F., a pressure of between about 100 and about 3000 pounds per square inch, utilizing a liquid hourly space velocity of between about 0.1 and about 4 in the presence of a molar ratio of hydrogen to hydrocarbon of between about 2 and about 80 and in the presence of a hydrocracking catalyst consisting essentially of an acidic cracking component of at least two refractory oxides of elements selected from groups IIA, IIIB, IVA and IVB of the periodic table, characterized by an activity index of at least 25, which component has deposited thereon between about 0.05 and about 10 percent by weight of the finished catalyst of a platinum metal to yield a product comprising components boiling in the gasoline and fuel oil range, subjecting said product to fractionation to separate therefrom a fuel oil fraction having an initial boiling point of about 500° F. and a lighter fraction having an initial boiling point of about 400° F. and an end boiling point of about 500° F., conducting the latter fraction to a reforming zone maintained at a temperature between about 600° F. and about 1000° F., a pressure between about 50 and about 1000 pounds per square inch, a liquid hourly space velocity of between about 0.1 and about 10 and a hydrogen to hydrocarbon mole ratio of 0.5 to 20 in the presence of a reforming catalyst, separating the resulting reformate into a gasoline fraction boiling below about 400° F. and a fraction boiling above about 400° F., blending the latter fraction with the aforesaid fuel oil fraction, recycling hydrogen produced in the reforming zone to the hydrocracking zone and collecting said gasoline fraction and the blended fuel oil fraction.

9. The process of claim 6 wherein the hydrocracking catalyst is platinum deposited on a silica-alumina composite and where the reforming catalyst is platinum deposited on alumina.

References Cited in the file of this patent

UNITED STATES PATENTS

| | | |
|---|---|---|
| 2,334,159 | Friedman | Nov. 9, 1943 |
| 2,703,308 | Oblad et al. | Mar. 1, 1955 |
| 2,769,679 | Tyson | Nov. 6, 1956 |
| 2,914,457 | Beavon | Nov. 24, 1959 |
| 2,958,643 | Friedman | Nov. 1, 1960 |
| 2,984,614 | Porter et al. | May 16, 1961 |
| 3,012,961 | Weisz | Dec. 12, 1962 |

FOREIGN PATENTS

| | | |
|---|---|---|
| 971,072 | Great Britain | Feb. 26, 1958 |